No. 622,492. Patented Apr. 4, 1899.
J. W. KINIRY.
ACETYLENE GAS GENERATOR.
(Application filed Nov. 22, 1898.)
(No Model.) 2 Sheets—Sheet 1.
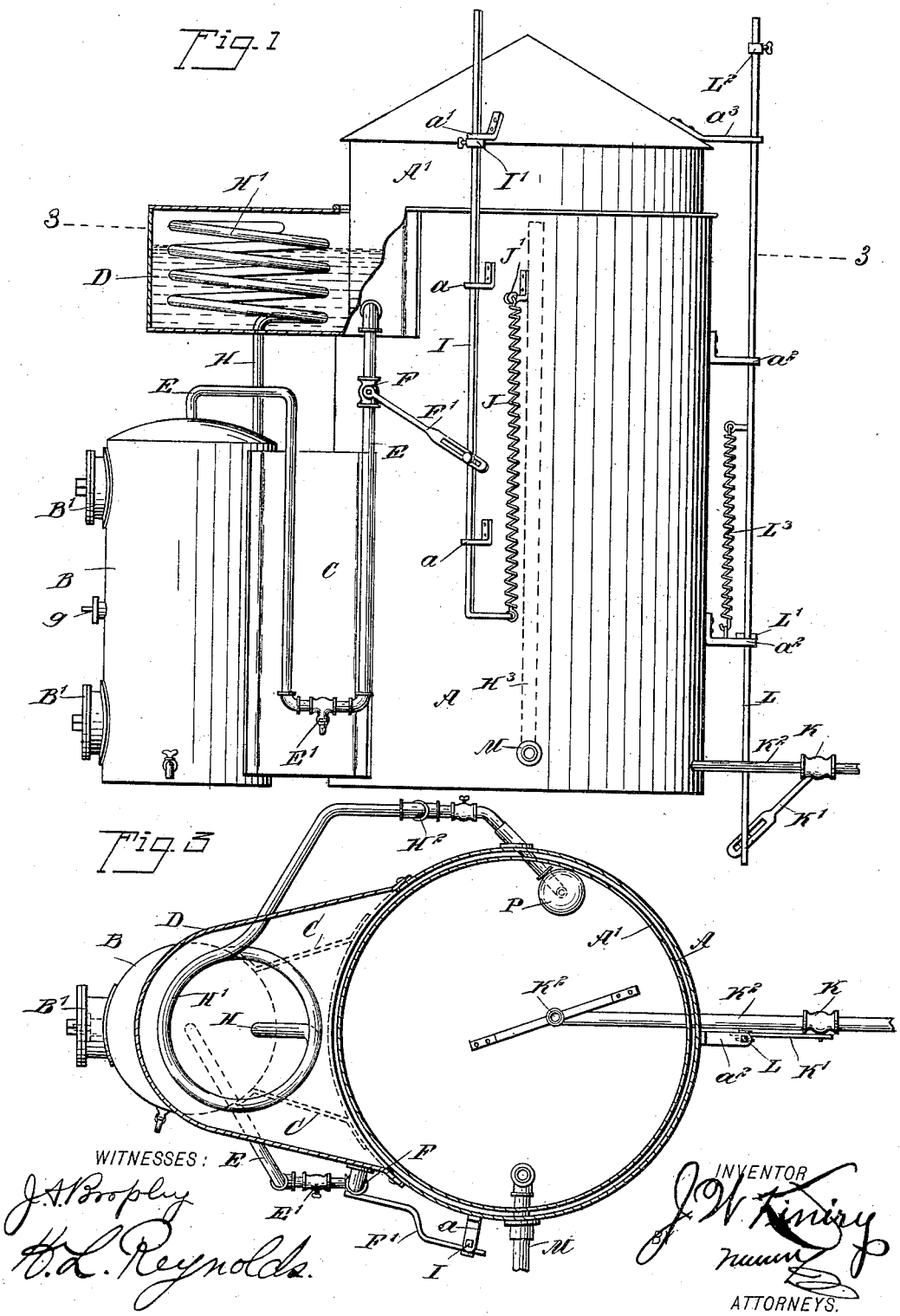

No. 622,492. Patented Apr. 4, 1899.
J. W. KINIRY.
ACETYLENE GAS GENERATOR.
(Application filed Nov. 22, 1898.)
(No Model.) 2 Sheets—Sheet 2.
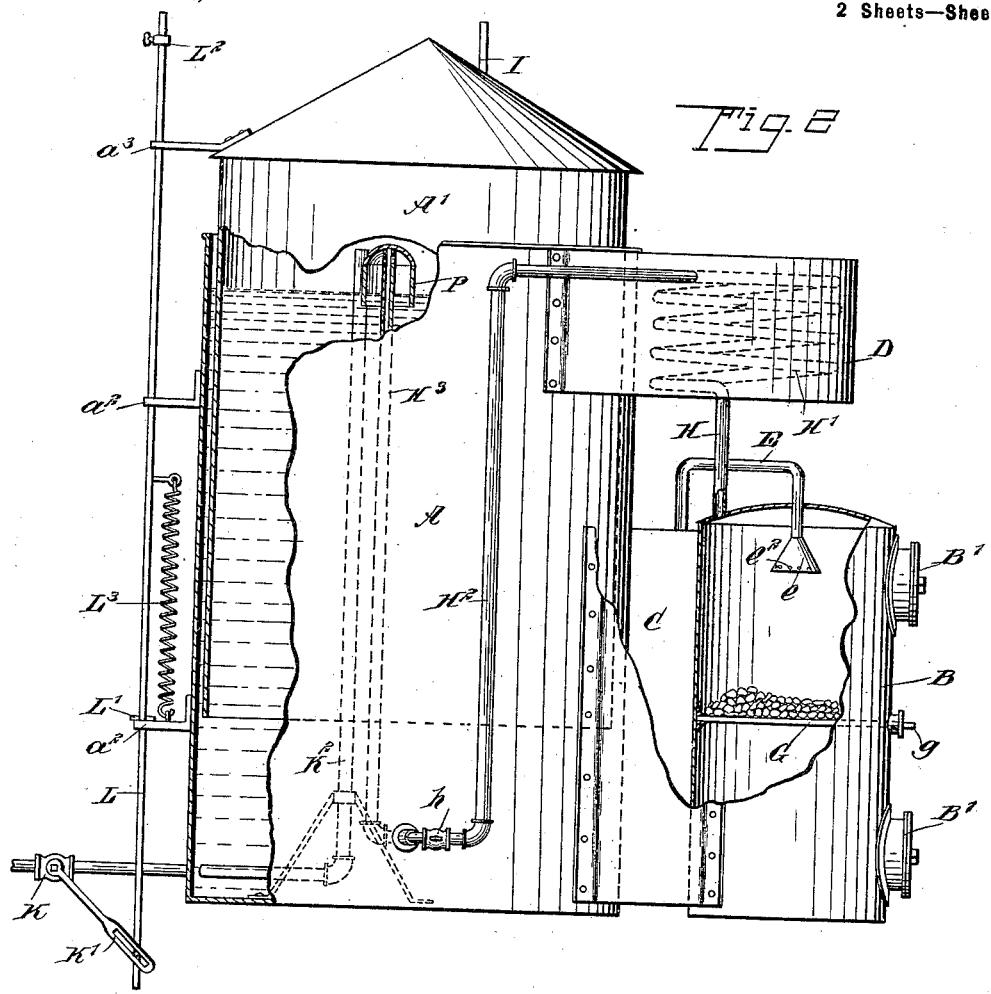
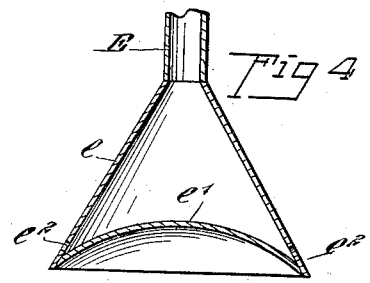
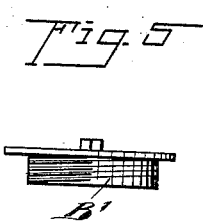
WITNESSES:
INVENTOR
ATTORNEYS.

UNITED STATES PATENT OFFICE.

JAMES WM. KINIRY, OF BELOIT, KANSAS.

ACETYLENE-GAS GENERATOR.

SPECIFICATION forming part of Letters Patent No. 622,492, dated April 4, 1899.

Application filed November 22, 1898. Serial No. 697,184. (No model.)

*To all whom it may concern:*

Be it known that I, JAMES WM. KINIRY, of Beloit, in the county of Mitchell and State of Kansas, have invented a new and Improved Acetylene-Gas Apparatus, of which the following is a full, clear, and exact description.

My invention relates to an improvement in apparatus for the production of acetylene gas from calcium carbid and comprises the novel features of construction and combinations of parts hereinafter described, and pointed out in the appended claims.

Reference is to be had to the accompanying drawings, forming a part of this specification, in which similar characters of reference indicate corresponding parts in all the views.

Figure 1 is a side elevation of the device, the water-tank being shown in vertical section. Fig. 2 is an elevation of the opposite side of the device, a portion of the gasometer and the generator being shown in vertical section. Fig. 3 is a horizontal section on the line 3 3 in Fig. 1. Fig. 4 is a vertical section through the sprinkler-head for the generator, and Fig. 5 is an edge view of one of the caps for closing the side openings in the generator.

The generator is such as is used in that class of acetylene-gas apparatus in which an ordinary gasometer is employed and the gas is generated by sprinkling water upon the carbid.

The gasometer is of the usual form, and consists of a tank A and a bell A', said tank in practice being nearly filled with water and the bell rising and falling in the water, and thus preserving a seal between the tank and the bell. The generator consists of a closed tank B, which for convenience is located alongside of the gasometer and is secured thereto by means of plates C or other suitable supports, which are secured to the gasometer and the generator in any convenient manner.

The generator is provided between its upper and lower ends with a grate G, adapted to support the carbid. This grate may be of any suitable form which will permit the lime resulting from the decomposition of the carbid to fall through the grate to the bottom of the generator B. The grate is mounted on a central pivot $g$, one end of which extends outside of the generator and is adapted to be engaged by a handle or any convenient tool, so that the grate may be shaken and the lime which has collected thereon may be shaken down through the grate.

The generator is provided with two side openings, one located at the upper part thereof and the other at the lower part, the openings being closed by caps B', the body portions of which are externally threaded and screw into said openings. Any other suitable closure may be substituted for the caps B', but the form of closure shown is a preferable one, as it may be readily made gas-tight. The carbid is placed in the generator through the upper opening, and the refuse is extracted at the lower opening.

A pipe E extends into the upper end of the generator, and within the generator said pipe has a sprinkler-head attached thereto consisting of a cone $e$, provided with a closed bottom $e'$, preferably arched or convex, as shown in Fig. 4. The sides of the cone are provided with outlet-openings $e^2$, located just above the bottom $e'$, and through which openings the water passes from the cone and drips upon the carbid on the grate G. The pipe E extends horizontally for a short distance and is then formed with a downwardly-extending loop, thus constituting a water seal, the other end of the pipe entering the lower portion of the water-tank D, attached to the upper end of the tank A. The pipe E is provided with a regulating-valve F, by which the supply of water is controlled, and a drainage or blow-off valve E', the stem of the valve F having an arm F' attached thereto, said arm being slotted at its outer end and engaging a pin upon a vertical rod I, mounted to slide within guides $a$, secured to the outer surface of the gasometer-tank A. The lower end of the rod I is bent at a right angle and has attached thereto one end of a spring J, the other end of the spring being attached to a projection J', secured to the outside of the tank A, near its upper end.

The upper end of the rod I passes through a guide $a'$, mounted upon the gasometer-bell A', and a collar I' is adjustably secured on the upper portion of the rod I and beneath the guide $a'$. When the gasometer-bell falls, the rod I will be pressed downward, which will cause the valve F to be opened or closed, depending upon the height to which the gasometer-bell has risen. In the lowermost and the uppermost positions of the bell A' the valve is closed; but when the bell is in an intermediate position the valve is open. The valve E' may be used to drain the pipe D, also to blow gas back through the sprinkler to clean it.

A pipe H connects with the upper end of the generator and passes through the bottom of the tank D, and within the tank the pipe is formed into a coil H', through which the gas passes and is cooled. The pipe H then extends outside of the tank D and has a downwardly-extending leg $H^2$, the lower end of which passes horizontally into the gasometer-tank and then extends upward in a vertical leg $H^3$, the upper end of which is above the level of the water in the tank A. The pipe H is provided with a check-valve $h$.

A pipe $K^2$ enters the lower end of the tank A and extends upwardly in the tank to a point above the level of the water in said tank, and the pipe $K^2$ outside of the tank is provided with a blow-off valve K, to the stem of which is attached a slotted arm K' similar to the arm F' attached to the stem of the valve F, said arm K' being connected with a pin on a vertically-extending rod L, mounted to slide in guides $a^2$ on the gasometer-tank and a guide $a^3$ on the gasometer-bell. A collar L' surrounds the rod L just above the lowermost guide $a^2$ and limits the downward movement of the rod, and a collar $L^2$ is also attached to the upper end of the rod L, above the guide $a^3$. The rod L is normally held down by a coil-spring $L^3$, secured at one end to the rod and at the other end to the lowermost guide $a^2$.

In the ordinary operation of the gasometer-bell the valve K will not be affected. If, however, the supply of gas should become excessive, the gasometer-bell will rise to such a point that the guide $a^3$ will engage the collar $L^2$ and by means of the rod L will open the valve K and permit the gas to escape until the gasometer-bell has fallen to such a point that the spring $L^3$ may act to close the valve K. The pipe leading outward from the valve K may be extended to any suitable place where the escape of gas will do no harm. The gas for consumption is conducted from the gasometer through a pipe M, the inner portion of which extends upward in the tank, the upper end of said pipe being at a point above the level of the water in the tank.

The operation of my device is entirely automatic, the supply of water to the carbid being regulated by the rise and fall of the gasometer, as previously explained. The gas in its passage through the coil H' will be cooled to such a degree that there will be no danger encountered in the use of the gas.

To the upper end of the pipe $H^3$, which conveys the gas from the generator to the gasometer, is attached an inverted bell P, which has its lower open end projecting beneath the water in the gasometer, so that the gas is all forced through the water in small bubbles, and it is thereby filtered and purified.

Having thus described my invention, I claim as new and desire to secure by Letters Patent—

1. An acetylene-gas generator comprising a carbid-holder, an elevated water-supply, a funnel within said holder above the carbid and connected with the water-supply, said funnel having an upwardly-convexed bottom and holes in its side just above its bottom, substantially as described.

2. An acetylene apparatus, comprising a gasometer the tank of which has a projecting cooling-chamber extending laterally at its upper end and communicating with the tank, a generator secured alongside of the gasometer-tank beneath the cooling-chamber, a water-supply pipe connecting the cooling-chamber with the upper part of the generator and having a downwardly-dropping loop between, a valve in said pipe, a lever connected with said valve, a vertical rod mounted to slide in guides and connected with the valve-lever, a spring for raising the rod, a tappet or arm on the gasometer-bell engaging the rod to depress it, and a gas-conveying pipe leading from the generator to the gasometer and having a cooling-coil therein lying within the cooling-chamber, substantially as described.

3. An acetylene apparatus, comprising a gasometer, the tank of which has a projecting cooling-chamber extending laterally at its upper end and communicating with the tank, a generator secured alongside of the gasometer-tank beneath the cooling-chamber, a water-supply pipe connecting the cooling-chamber with the upper part of the generator and having a downwardly-dropping loop between, a valve in said pipe, means for controlling said valve by the rise and fall of the gasometer, and a gas-conveying pipe leading from the generator to the gasometer and having a cooling-coil therein lying within the cooling-chamber, substantially as described.

JAMES WM. KINIRY.

Witnesses:
J. D. YOUNG,
AUGUST KELLER.